United States Patent
Wetzel

(10) Patent No.: US 7,802,443 B2
(45) Date of Patent: Sep. 28, 2010

(54) TOTAL ROOM AIR PURIFICATION SYSTEM WITH AIR CONDITIONING, FILTRATION AND VENTILATION

(75) Inventor: Lawrence E. Wetzel, Cazenovia, NY (US)

(73) Assignee: Air Innovations, Inc., North Syracuse, NY (US)

( * ) Notice: Subject to any disclaimer, the term of this patent is extended or adjusted under 35 U.S.C. 154(b) by 837 days.

(21) Appl. No.: 11/786,946

(22) Filed: Apr. 13, 2007

(65) Prior Publication Data
US 2008/0250800 A1    Oct. 16, 2008

(51) Int. Cl.
*F25D 23/12*  (2006.01)

(52) U.S. Cl. .............. 62/262; 62/78; 62/186; 62/259.1; 62/263; 165/54; 454/196; 454/200

(58) Field of Classification Search ........ 62/262, 62/263, 78, 186, 259.1; 165/8, 54, 66; 454/196, 454/200
See application file for complete search history.

(56) References Cited

U.S. PATENT DOCUMENTS

| | | | |
|---|---|---|---|
| 3,777,506 A * | 12/1973 | Hergatt et al. ............... | 62/237 |
| 4,228,849 A * | 10/1980 | Heinola .................... | 165/286 |
| 5,228,306 A * | 7/1993 | Shyu et al. ................ | 62/176.6 |
| 5,431,215 A * | 7/1995 | Davis ...................... | 165/11.1 |
| 5,775,125 A * | 7/1998 | Sakai et al. ................ | 62/410 |
| 6,209,622 B1 * | 4/2001 | Lagace et al. ............... | 165/8 |
| 6,612,365 B1 * | 9/2003 | Saishu et al. ............... | 165/54 |
| 7,174,741 B2 * | 2/2007 | Lee et al. .................. | 62/412 |
| 2003/0177777 A1 * | 9/2003 | Brumett ................... | 62/264 |
| 2006/0021375 A1 * | 2/2006 | Wetzel et al. .............. | 62/419 |

\* cited by examiner

*Primary Examiner*—Frantz F Jules
*Assistant Examiner*—Azim Rahim
(74) *Attorney, Agent, or Firm*—Bernard P. Molldrem, Jr.

(57) ABSTRACT

A self-contained air conditioner unit incorporates an energy recovery ventilator portion that brings about several changes of room air per hour with outdoor fresh air. There is an outdoor air intake plenum which furnishes the fresh air and the condenser air for the condenser coil, and a return air plenum. Air from the room return air plenum is HEPA filtered and conducted to the evaporator coil and evaporator fan, and is supplied back into the conditioned space. The energy recovery ventilator has a counterflow heat exchanger core situated between the return air plenum and the fresh air intake plenum, as well as two ventilation fans, one (or both) of which may be of variable or multiple speed. By controlling the fan speeds, it is possible to produce a neutral pressure, a positive or overpressure, or a negative or underpressure in the conditioned space. The unit can be wheeled into place and installed easily by personnel without special training. The unit can be scaled up in size and capacity for a larger room or whole house applications, or scaled down for smaller rooms or window mounting.

8 Claims, 3 Drawing Sheets

TOTAL ROOM AIR PURIFICATION SYSTEM WITH AIR CONDITIONING, FILTRATION AND VENTILATION

BACKGROUND OF THE INVENTION

The invention concerns room air conditioning and filtration equipment, and in particular is directed to a portable or mobile unit that provides for energy recovery ventilation, and which can operate in a positive pressure mode, a negative pressure mode, or a neutral pressure mode. The invention is also concerned with units that clean and condition the room air as well as remove and/or kill airborne pathogens. The unit can be provided with wheels or casters that facilitate bringing the unit into the conditioned space, and can employ intake and exhaust ducts to bring in fresh air and exhaust stale room air, and also conduct a flow of outside air over the air conditioning condenser to remove waste heat to the outdoors.

High Efficiency Particulate Air (HEPA) filters are used extensively in industrial, commercial and residential applications to filter out dust, dirt, and other allergens from the air which can harbor harmful bacteria or other micro-organisms. These filters are capable of filtering out more than 99.99% of the particles in the air.

Recently, due to outbreaks of contagious viral and bacterial diseases, and due to the increase in the incidence of asthma, there has been a heightened concern about contaminants in the indoor air, and about the ability to exclude or confine contaminants in a given area. The need for emergency isolation facilities may well exceed the capacity of area hospitals and clinics, and this may require use of hotel rooms or private spaces to confine infected patients or to protect the more vulnerable patients from airborne infection. In an emergency, it is expected that it will become necessary to isolate at least some of the patients. Some patients will need to be isolated in a fashion to keep any airborne contaminants within a confined area to protect others from the contagion. Other patients, e.g., burn patients, will need to be protected from outside contaminants reaching the patient area. Hospitals lack sufficient spaces that can be used for isolation of patients, whereas the need to isolate patients from the general public or from one another is critical in controlling the situation, thus requiring surge capacity facilities in addition to traditional hospitals.

Most hospitals today have only a few isolation rooms out of the hundreds of patient rooms in the facility. One reason for this is because isolation rooms are very expensive to build as they conventionally require separate, independent HVAC systems for each room to prevent the spread of contaminants to other areas of the hospital. In those cases where the patient is susceptible to contaminants, the room must operate at a positive pressure, whereas when the patient is infected with a contagious pathogen, the room must be under a negative pressure to protect other patients and hospital workers. However, even with isolation HVAC systems the rooms are not easy to convert from positive pressure to negative pressure or vice versa. These rooms are generally built either for positive pressure only or for negative pressure only, and this limits the flexibility of a hospital to deal with emergency situations.

It may also happen that private individuals may need to convert a room in their home to an isolation room. In that case, it would be desirable to be able to use the same equipment also as a normal air conditioner to create a comfortable, clean, and healthy living space when isolation is not needed.

The inventor herein proposes an air conditioner with a heat recovery ventilation or energy recovery ventilation feature, in which some outside air is exchanged with some part of the circulating indoor air, so that the occupants of the conditioned comfort space are provided with fresh air, and the burden of having stale unhealthy air is alleviated. The addition of an energy recovery heat exchanger core, together with suitable fans or other circulating equipment, makes it possible also to control room air pressure, relative to ambient or outside air pressure. In other words, the conditioned comfort space may be provided with neutral pressure (equaling outside air pressure), a negative pressure relative to outside air pressure, or a positive pressure relative to outside air pressure.

Air filtration units, known commercially as HEPAir units, are used extensively in clean room situations to control airborne contaminants while maintaining temperature and humidity control for critical processes such as the sterile packaging of medical devices or pharmaceuticals. These units are also used extensively in the manufacture of semiconductor devices. Units of this type are not usually available as simple portable air conditioning units, but are industrial in nature and capable of handling relatively large volumes of air against a high static pressure such as that encountered with high efficiency particulate air (HEPA) filters, and are capable of attaining an air exchange rate that is sufficient to assure dilution and purge. Accordingly, typical room air conditioning systems have not provided adequate filtration for purposes of trapping and removing viruses, bacteria, or similar airborne pathogens.

OBJECTS AND SUMMARY OF THE INVENTION

It is an object to provide a ventilating air conditioning unit for cleaning and conditioning of air in a room or comfort space, that can be easily installed in an existing room, can create a space having net positive pressure or net negative pressure, as needed, which creates a number of changes of the room air each hour, exchanging some of the circulating room air with fresh outside air, and which avoids the drawbacks of the prior art.

It is another object to provide a unit to convert an existing room, e.g., a hotel room, a bedroom, or a hospital room, into an isolation room, in which there is ventilation with fresh air, and in which all the fresh air and re-circulating air is conditioned, sanitized, filtered, and cleaned before it is supplied into the room.

It is a more particular object to create a self-contained unit that can be easily moved into the comfort space, and can be installed by fitting outside air ducts into a window frame, and then simply plugging the unit in and turning it on, and where installation is carried out by personnel with only a minimum of special training and without need for special tools.

In one aspect of the invention, the self-contained air conditioning unit with ventilation and pressure control can exchange a portion of the indoor circulating air of a conditioned space with fresh outside air to reduce airborne VOCs, and can also create a positive or negative pressure within the conditioned space. The unit has a shell or housing that contains a refrigeration circuit including a compressor, a condenser coil, and an evaporator coil. The condenser side of the unit includes an inlet port, an outdoor air intake plenum, and a condenser air path through the condenser coil. A condenser fan forces the air along the condenser air path to an outlet port. A pair of flexible intake and exhaust ducts connect the intake and outlet ports with fresh outdoor air. These can be positioned in a window panel that is adapted to fit the window frame of the room or other comfort space.

A conditioned air circuit is formed on the evaporator side of the unit, with a room return air intake on the housing leading into a return air plenum, a conditioned air path leading from the return air plenum through a HEPA filter and then through the evaporator coil to a supply air duct. An evaporator fan moves the air along the conditioned air path, and the air is discharged out from the supply air duct into the conditioned space.

An ERV air-to-air heat exchanger core within the housing has a fresh air path in counterflow with an indoor air path. The fresh air path has a fresh air intake port communicating with the outdoor air intake plenum and a fresh air outlet port discharging fresh air into the room return air plenum. The indoor air path has an indoor air intake port communicating with the room return air plenum and an indoor air outlet port discharging the indoor air into the outdoor air intake plenum. There are also a first, fresh-air intake ventilation fan and second, exhaust air ventilation fan forcing respective air flows along the fresh air path and the indoor air path of the ERV.

A sensor arrangement provides for sensing air pressure within the conditioned space relative to pressure outside the conditioned space. Also, a control circuit or the like is coupled with the sensor arrangement and with the first and second ventilation fans for controlling the air flow along the fresh air path and the indoor air path. The action of the ERV core and first and second fans is to effect about three fresh air changes per hour in the average size room, while recovering the heat energy to create and maintain a desired pressure (i.e., neutral pressure, overpressure or underpressure) in the conditioned space. The control circuit can be manual or automatic in operation.

The window panel for the ventilation ducts can include a plate member through which the ducts pass, with the plate member being adapted to fit the window frame. The conditioned air circuit may also include a UV sterilizer arrangement in advance of the HEPA filter.

In one preferred arrangement, the condenser air flow has a variable nominal air flow that is controlled by the control circuit. Either or both of the ventilation fans has a variable airflow that is controlled by the control means. All fans may be controlled in their air flow, giving greater flexibility in the ability to control the pressure in the room. In the described embodiment, the indoor or evaporator fan is operated at a constant speed to ensure the desired number of air changes that are filtered through the HEPA filter. The condenser fan can be operated at a reduced speed when there is no call for cooling, to ensure that there is a constant draw of fresh air into the system and to prevent short circuiting of the ventilator core.

Preferably, the heat exchanger core is a counterflow air-to-air heat exchanger for maximum thermal exchange effectiveness.

In a preferred arrangement, the self-contained air conditioning unit is formed of an upper portion and a lower portion, wherein the lower portion contains the refrigeration circuit, with the condenser air path passing from a first end thereof to a port at a mid portion thereof venting to the outlet port; the evaporator or conditioned air path passes from a second end thereof to a port at a midportion that vents to the room supply air duct. The upper portion contains the intake air plenum at a first end thereof corresponding to the first end of the lower portion. A first end cap closes off corresponding first ends of the upper and lower portions, and conducts air from the fresh air intake plenum to the first end of the lower portion; the upper portion also contains the room return air plenum and the HEPA filter at a second end thereof, which is situated in alignment with the second end of the lower portion. A second end cap closes off the second ends of the upper and lower portions, and conducts air from the room return air plenum and the HEPA filter down into the corresponding second end of the lower portion.

Important features of the units of this system which permit them to function in this application are the two separate ventilation fans, as well as the separate condenser fan and evaporator fan. The unit can be of relatively small size and highly portable (e.g., preferably fitted with casters or wheels) and requires only application of standard 115 v single-phase AC electric power. The ventilation ducts are light-weight flexible ducts that draw in fresh outdoor air that serves both as the condenser air and as fresh inlet air for the ERV ventilator core. The housing may be corrosion-free all-aluminum or plastic cabinet construction. The unit is preferably a completely self-contained system, with heating and air conditioning, UV sterilization, HEPA filtration, ERV, and positive and/or negative pressurization, all contained in the housing. Some optional equipment features include humidity control (i.e., a humidifier).

The described units, which may be referred to as total room air purification system units, may have a nominal cooling capacity of e.g., 5000 BTU/H and a 1000 W heater, and are sized for a typical bedroom, for example. The units can of course be scaled up for larger rooms or whole-house use, or down in size and capacity for other applications, such as window mounted units for smaller rooms. The dimensions here are favorably about forty-six inches wide, thirty inches tall, and fourteen inches deep. The unit is provided with wheels for mobility, and weights less than 150 pounds. The power cord is about six feet in length, and the unit draws less than 15 amperes. An adjustable discharge duct provides separation of the supply air grille from the intake or return air grille, and permits the direction of supply air discharge to be changed as need be.

In one embodiment, the relative fan speeds of the ventilation fans control the room pressure. For a neutral or balanced pressure in the room, both fans operate at the same speed. For positive room pressure or overpressure, the fresh-air make-up side is operated at full speed, and the indoor air exhaust or discharge side can be operated at a lower speed or at zero speed. For a negative room pressure or underpressure, the fresh air ventilation fan can be operated at low or zero speed, with the indoor air exhaust or discharge fan operated at full speed. The unit can be configured specifically for overpressure or specifically for underpressure, or can be configured to achieve both, as well as neutral pressure.

The condenser fan can be a two-speed fan, running on high speed for air conditioning operation, i.e., where there is a call for cooling, and to exhaust condenser heat, and operating at a lower speed at other times, i.e., to maintain an air flow though the fresh air inlet plenum so there is a continuous exchange of fresh air and room air. The evaporator fan may preferably operate constantly at full speed.

In the system described here, the air that is brought in from outdoors and is returned to the outdoors, i.e., the outdoor air, serves as condenser air for removing heat and also serves as a source of fresh air for ventilation. The air within the room or other conditioned space, i.e., room air or conditioned air, is the recirculating air, which is discharged from the unit as supply air, and is drawn into the unit as return air, where it proceeds to the evaporator as evaporator air. A portion of this passes through the ventilation device or ERV where it mixes with the outdoor air and is discharged to the outdoors.

The above and many other objects, features, and advantages of this invention will become apparent from the ensuing description of selected preferred embodiments, which should be read in connection with the accompanying Drawing.

BRIEF DESCRIPTION OF THE DRAWING

Reference is made to the drawing Figures, in which.

DESCRIPTION OF THE PREFERRED EMBODIMENTS

Figure 1:
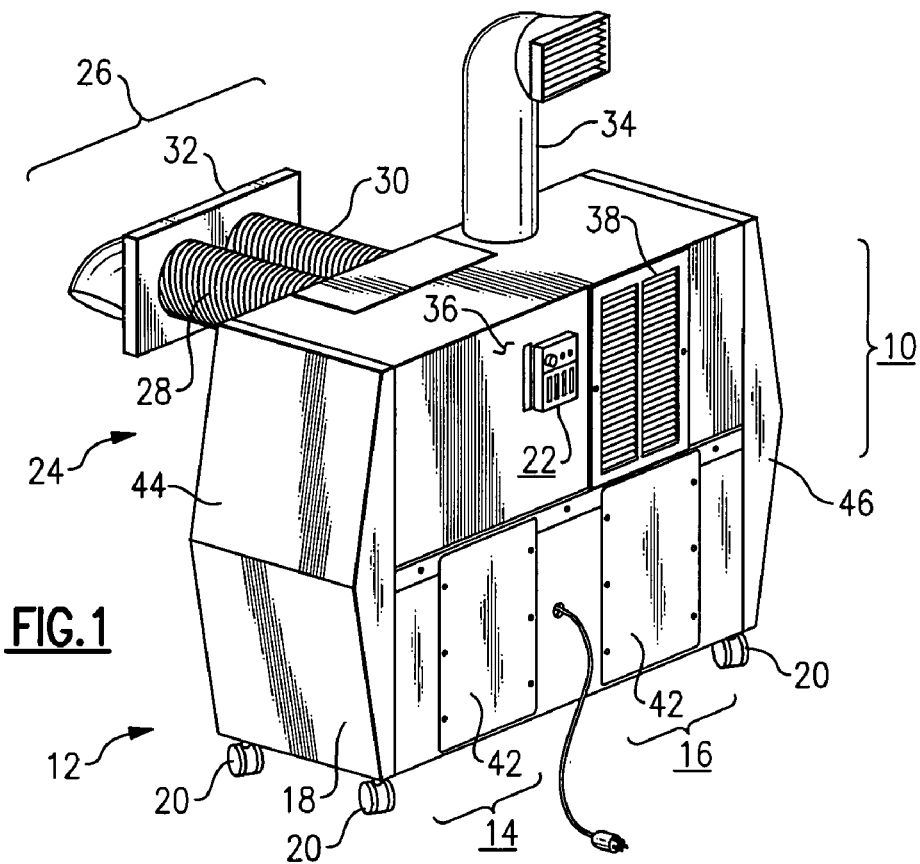
FIG. 1 is a front perspective of an air conditioner unit with ventilation and pressurization control, according to one embodiment of this invention.

With reference to the drawing Figures, FIG. 1 shows the general construction of an ERV air conditioning unit 10 of one possible embodiment. In this embodiment, the unit has a lower portion 12 containing the refrigeration and main air circulation equipment, and an upper portion 24 containing the ventilation equipment, plus air plenums and filtration equipment.

The lower portion 12 has an outdoor or condenser side 14, at the left in FIG. 1, and an indoor or evaporator side 16, which is at the right in FIG. 1. The unit has a housing or shell 18, which can be a rugged sheet metal or plastic material, with the unit 10 being mounted on casters or wheels 20 to permit it to be easily moved into a desired position within the room or other conditioned space. A small panel 22 containing controls and sensors (i.e., room air pressure, temperature, and humidity, for example) is located on the front of the upper portion 24.

The upper portion 24 includes the intake and exhaust capability for the outdoor air, supply and return ports for the room air, as well as the integrated energy recovery ventilation equipment and the HEPA filter that is incorporated into the air conditioning unit within a shell or housing 36 of the upper portion 24. Here an outdoor air duct assembly 26 is shown extending from the back of the unit, including an outside air (fresh air) intake duct 28 and an outside air exhaust duct 30. These ducts are preferably formed of flexible tubing so they can be easily extended to an available window. These two ducts 28, 30 are held in a window panel member 32 that is adapted to fit into a window frame. This panel 32 can be adjusted in width to match the window and may incorporate sealing material at its top, bottom, and sides.

A room supply air discharge duct 34 extends upward above the top of the unit 10, and this can be adjusted for its vertical height as well as the direction of discharge. There is a return air grille 38 in the front of the upper portion housing 36. A power cord 40 can be plugged into a standard AC outlet to obtain 110-120 v power. In other embodiments, 220 v power may be required.

Access panels 42 are shown on the lower portion 12, which may be removed for equipment access, and in other views these are omitted. Also, there is a left end cap 44 that serves to close off the corresponding left ends of the upper portion 24 and lower portion 12 and to duct the outside or condenser air to the lower portion, and is removable to service the pre-filter, fans and condenser coil; likewise there is a right side end cap 46 that covers the right ends of the upper and lower portions, and serves to duct the evaporator air, i.e., conditioned air to the lower portion, and to service the HEPA filter and the evaporator coil. In this embodiment, the end caps 44, 46 are bowed or arched out, in a V-shape, but in other embodiments, other shapes of end cap may be employed.

The unit 10 shown here in this embodiment may have dimensions of fourteen inches in depth (front to back), about forty-six inches in width (from the left end to the right end), and thirty inches in height (not including the rise height of the supply duct 34).

Figure 2:
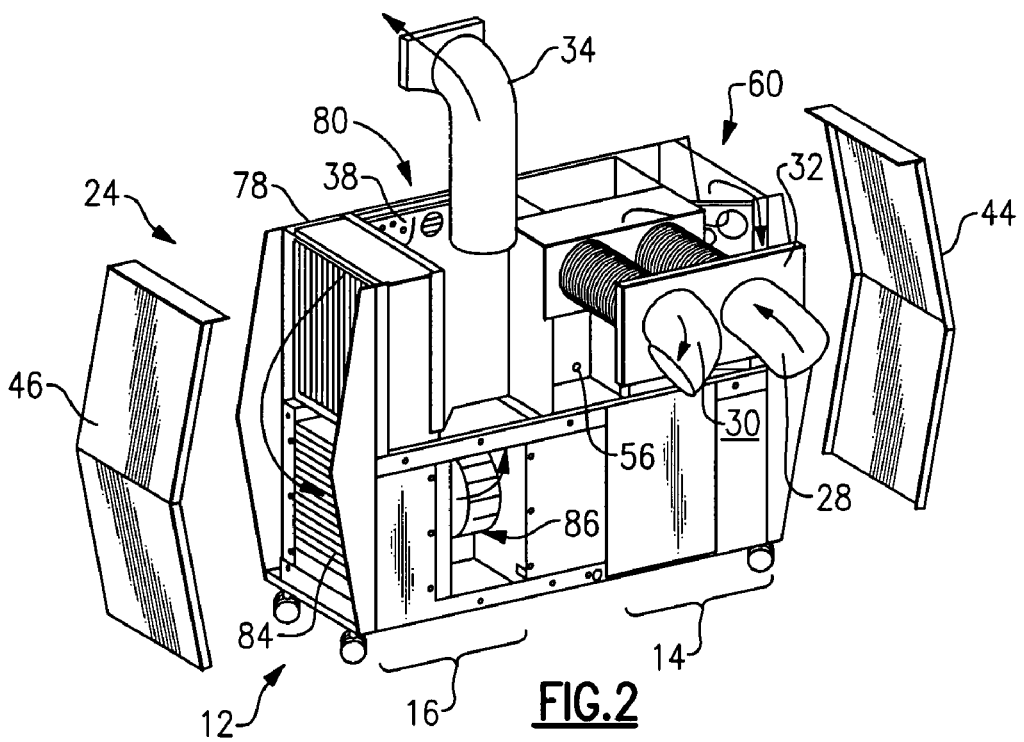
FIG. 2 is a rear perspective view of this embodiment, partly exploded and with some panels removed.
Figure 3:
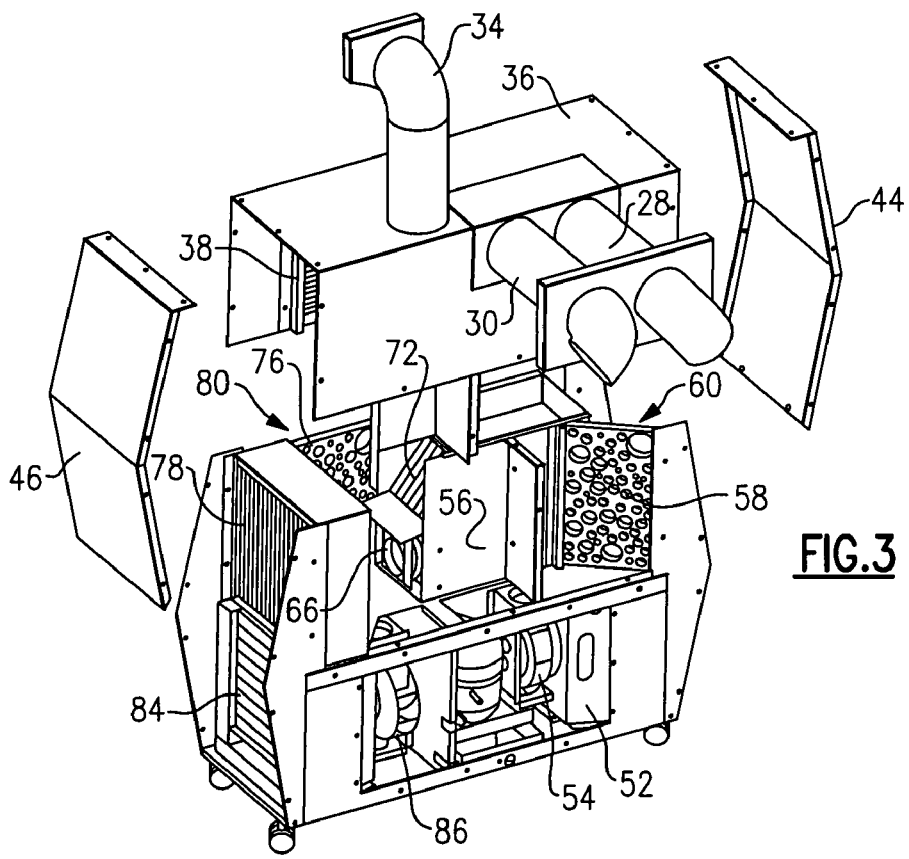
FIGS. 3 and 4 are rear perspective exploded of this embodiment.
Figure 4:
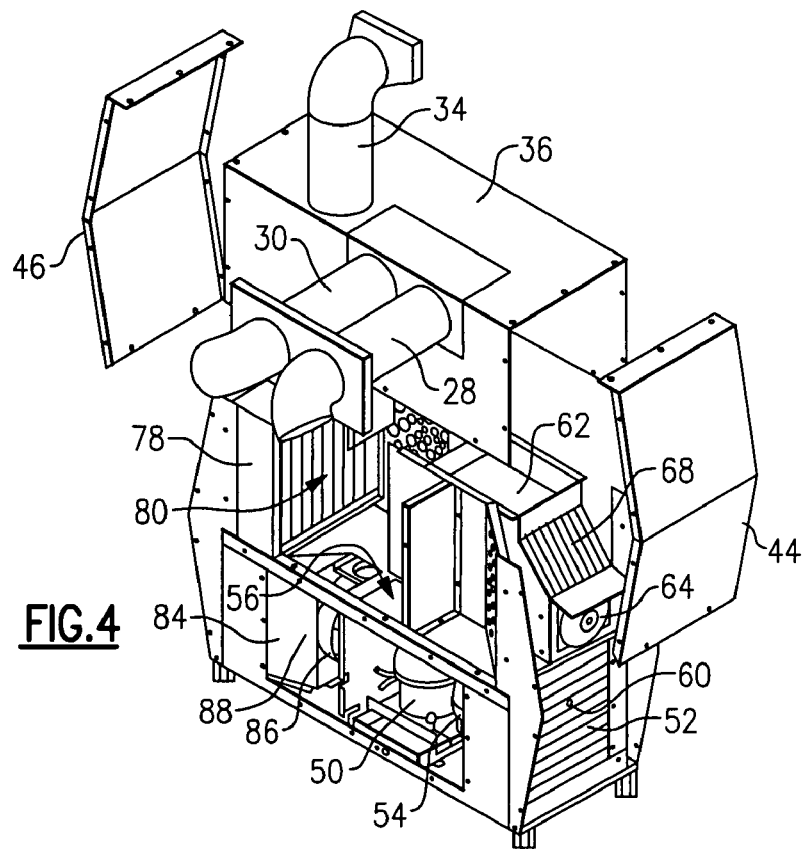

Details of the unit 10 may be seen in the partly cutaway or exploded views of FIGS. 2, 3, and 4. FIGS. 2 and 3 are views from the rear and so the indoor or evaporator side of the unit appears on the left, and the outdoor air or condenser side appears on the right.

Within the lower portion 12 of the unit is a compressor 50, which supplies compressed vapor refrigerant to a condenser coil 52, where a condenser fan 54 forces outdoor air through the coil 52. In this arrangement, the air is drawn in the direction from the right end of the lower portion towards the center, and the fan 54 discharges the condenser air upwardly into an outdoor air exhaust plenum 56, which is defined within the upper portion 24 by a number of partitions and baffles. Intake outside or fresh air is drawn in, through the outdoor air intake duct 28, through an intake air coarse filter or pre-filter 58, into an outside air intake plenum 60 (shown on the right side in FIGS. 2 and 3) and which is open to the end of the upper portion. The end cap 44 forms the air path that conducts the outdoor air downward to the condenser coil 52 and fan 54. The outdoor air passes through the coil 52 to pick up exhaust heat, and then proceeds up to the discharge plenum 56, and this air is conducted to the outdoors via the exhaust conduit 30.

Figure 5:
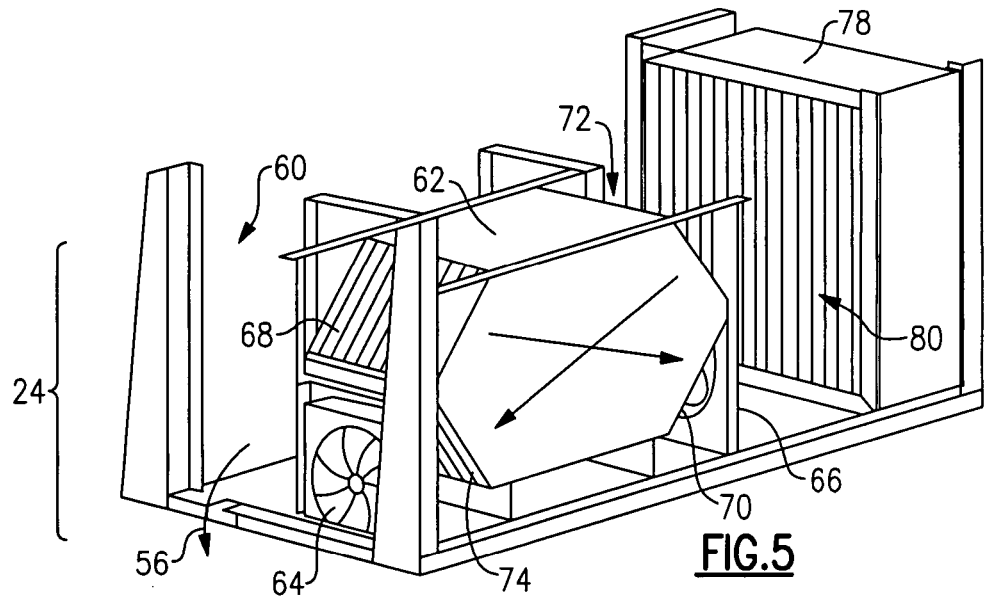
FIG. 5 is a front perspective view of a portion of the upper part of this embodiment, showing the ERV core and the first and second ventilation fans and HEPA filter.

The integrated energy recovery ventilator or IERV is partly visible in FIGS. 3 and 4, and includes an energy recovery core 62 which is a counterflow air-to-air heat exchanger, which may be a plate-type device, and first and second ventilation fans 64 and 66, that is, a room air exhaust fan 64 and a fresh air intake fan 66, which cause air to flow through the core 62. The construction and operation of the IERV will be discussed in more detail later. As shown in FIG. 5, the core 62 has a fresh air intake port 68 at its upper left and a fresh air port 70 at its lower right, which form the path that the outdoor air or fresh air follows; the core 62 also has an indoor or room air port 72 at its upper right and an indoor or room air exhaust port 74 at its lower left, which form the path for the indoor air to take when the sensible heat or total heat is being exchanged with fresh outdoor air.

The first and second ventilation fans, i.e., the room air exhaust fan 64 and the fresh air intake fan 66, are disposed at the room air exhaust port 74 and the fresh air port 70, respectively, and serve to draw air streams from the fresh air and indoor air, respectively, through the core 62. Either or both of these fans 64, 66 could be placed in an alternate position (i.e., at the intake 68 and/or intake 72) to push the air through the core rather than draw the air through, if desired to satisfy design requirements. In this embodiment, a fraction of the circulating room air is replaced with fresh outside air due to action of the IERV, i.e., the heat exchanger core 62 and fans 64, 66.

The conditioned air pathway of the unit 10 begins with room air flowing through the return air grille 38, and then through a return air pre-filter 76 into a return air plenum 80 (at the left side in FIGS. 2, 3, and 4 and at the right side in FIG. 5). The air leaving the plenum 80 passes through a high efficiency particulate air filter or HEPA filter 78, and then is conducted downward by the end cap 46 to the end of the lower portion 12, where the air flows through the indoor or evaporator side of the unit. There may be an optional ultraviolet light source 82 for killing microbes (bacteria, virus, and mold spores) within the plenum 80 and on the plenum side of the HEPA filter 78.

The return room air flows through an evaporator coil 84, and then is drawn by an evaporator fan 86 and is forced upwards into the conditioned air plenum, where it is discharged via the supply duct 34 and is sent back into the conditioned space. An electric heating coil 88 may also be provided to reheat the room air, as necessary, before it is returned via the supply duct. The heater coil 88 may be contained within the same shroud that contains the evaporator coil.

The operation of the unit may be explained with reference to the schematic diagram of FIG. 6. The unit is represented here with the upper portion 24 and lower portion 12; and with wheels or casters 20 positioned at the base of the housing or casing 36. The fresh air intake and exhaust ducts 28 and 30 are shown here penetrating a room wall W (via a window in which the panel 32 is fitted tightly). Outdoor air enters through the pre-filter 58 into the outside air intake plenum 60, and this air is conducted down to the condenser coil, and the condenser fan moves the air along the path to the discharge air duct 30. On the other side of the unit, room air from the conditioned space enters through the return air grille 38 and the prefilter 76 into the room return air plenum 80. The air passes out from the plenum 80 and through HEPA filter 78 and then down to the evaporator coil 84. The evaporator fan 86 moves the conditioned air out through the duct 34 from which it is returned to the conditioned space. In the preferred embodiment, the evaporator fan has a capacity of 250 cfm, and as mentioned before, is constantly run at full capacity. This ensures there is continuous HEPA filtration and ventilation of air supplied to the room. The condenser fan 54 has a full speed capacity of 250 cfm, and a low speed capacity of about 60 cfm. The condenser fan 54 can be operated at a the lower capacity, running even when there is no call for cooling, sufficient to ensure an airflow through the intake and exhaust ducts, and to prevent short circuiting of the exhaust air into the supply air. All the air, both room return air and fresh intake air, passes through the HEPA filter 78 before the air returns to the room.

In the refrigeration circuit of the compressor 50, condenser coil 52 and evaporator coil 84, a high pressure vapor line (V) is shown from the pressure side of the compressor to the condenser coil, a liquid line (L) passes from the condenser coil to the evaporator coil, passing through an expansion valve (not numbered), and with low pressure vapor returning through a vapor line (V) to the suction port of the compressor.

Figure 6:
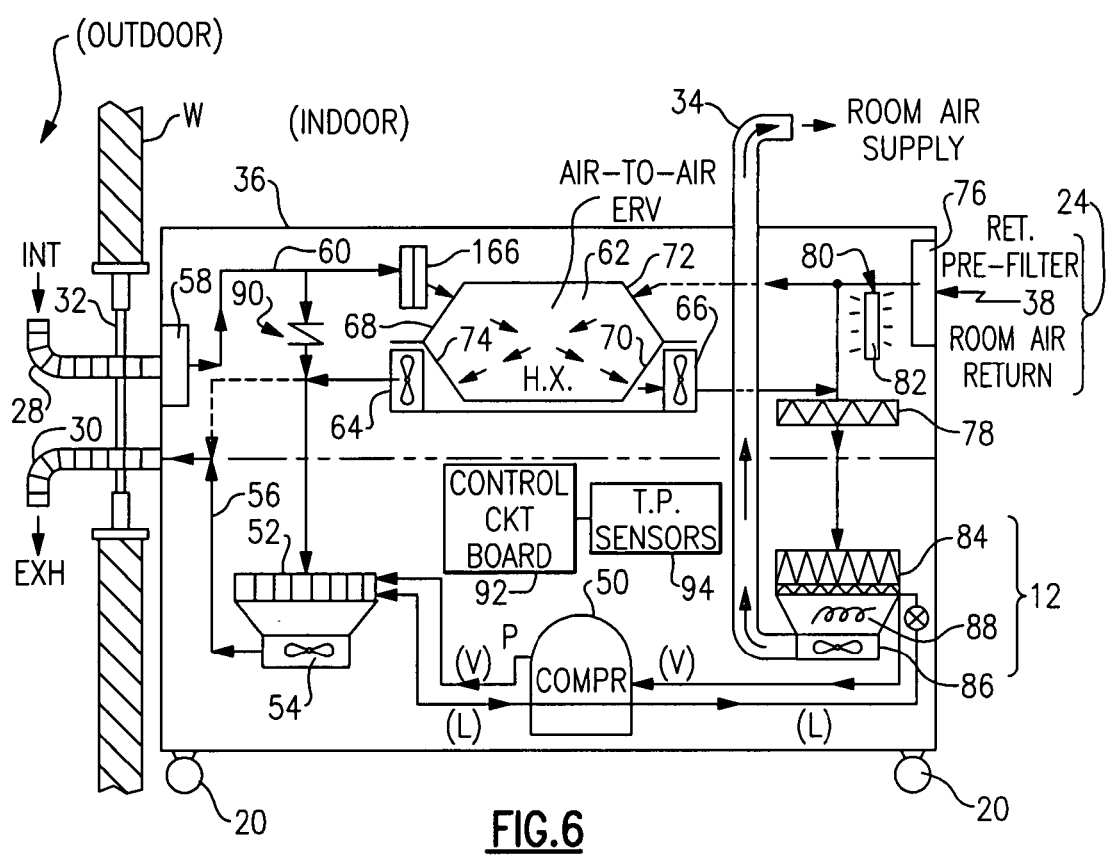
FIG. 6 is a schematic view of this embodiment for explaining its operation.

There is a flow of air between the plenum 60 and the plenum 80 through the core 62, as shown via arrows in FIG. 6, with some fresh outdoor air being drawn by the fan 66 through the fresh air intake port 68 and fresh air port 70, and a similar flow of room indoor air being drawn by the fan 64 through the room air exhaust port 72 and exhaust port 74. Note that in the core illustrated in FIGS. 5 and 6, there is a significant center portion in which the room air leaving and the fresh air entering are in counterflow, as compared with the traditional diamond-shape ERV or TRV core, in which the air is in cross-flow. This produces a more efficient exchange of heat than with the traditional cross-flow core.

Also, in the described embodiment, the core is formed of parallel metal plates, which carries out exchange of sensible heat between the two air flows. However, it is also possible with other materials and technologies to exchange some or most of the latent heat (i.e., humidity). The ventilation fans 66 and 64 are shown at the discharge or exhaust ports of the IERV core 62, for drawing the air flow through the core. However, in alternative embodiments, one or the other or both fans could be positioned elsewhere. Here, an alternate, blow-through position for the fresh air intake ventilation fan is shown as 166.

The ventilation room air exhaust fan 64 in this embodiment has a capacity of about 50 cfm, and the ventilation intake room air fan 66 may have a variable capacity of zero to 50 cfm. Both fans may have a variable capacity. These are configured and controlled so as to create a positive, negative, or neutral pressure in the conditioned space.

Shown here is an optional back-flow-prevention damper 90 to control some of the flow of air entering the plenum 60 and mixing with the indoor air being discharged from the core 62 through the fan 64. Also shown schematically in FIG. 6 are a control circuit board 92, with electronics for controlling the air conditioning circuit, i.e., compressor 50, evaporator fan 86 and condenser fan 54; and for controlling the ventilation fans 64 and 66. A set of temperature and air pressure sensors are shown as sensor board 94. A bypass pathway can be used so that the condenser fan does not have to be run continuously, as is shown in dotted line in FIG. 6.

The air flow through the conduits or ducts 28 and 30 on condenser side 14 provides a constant flow of outside air that serves to carry away exhaust heat, and also to exchange some of the circulating indoor air with fresh outdoor air. The IERV carries out about three changes of fresh ventilation air per hour, for an average size room, and twelve room air changes per hour through the HEPA filter.

Pressure control of the unit 10 is carried out by controlling the fan speeds of the various fans. The condenser fan can be controlled between zero cfm and 250 cfm, and in this embodiment a two-speed fan is used. The ventilation fans 64 and 66 can be controlled between about zero cfm and 50 cfm. The evaporator fan 86 in this embodiment is operated at constant speed. Control of fan speeds allows the unit to increase the amount of fresh air entering the conditioned space when it is necessary to create a room overpressure, or to increase the amount of room air leaving through the IERV core when needed to create an underpressure.

The unit 10 can be configured to create a positive pressure or overpressure in a normal room so the room can be made into an isolation room for a burn victim or a patient suffering from allergies and who needs to be protected from infection from airborne pathogens that may be present in the air outside the patient's room. Alternatively, the unit 10 can be configured to create a negative pressure or underpressure in the conditioned space, e.g., to create an isolation room for confining a patient who carries an infectious disease, and to protect the outside environment from contamination.

In this embodiment all of the air passing through the unit, including the fresh ventilation air, is subjected to HEPA filtration (and UV sterilization) so that the air being discharged into the room is cleaned and filtered.

The unit should carry out about three fresh-air changes per hour, and as many as twelve room-air changes per hour.

In an alternative implementation, the unit 10 may incorporate an "occupied/unoccupied" switch, wherein in the "occupied" setting the unit would be running constantly, while in the "unoccupied" setting the unit would be running only if there is a call for cooling (or for heating).

Also, while a portable or wheeled-in unit is shown here, and sized for a typical bedroom, the principles of this invention can be applied to a built-in unit or stationary unit made to accommodate a single room or a suite of rooms. The unit could be downsized to fit into a window, like a window air conditioner. Furthermore, while this embodiment employs the ventilation portion superposed above the air conditioning portion of the unit, the unit could be constructed in other configurations and still employ the main principles of the invention.

These and other objects, features, and advantages of this invention would be apparent to persons who work in this field. While the invention has been described with reference to preferred embodiments, many modifications and variations would present themselves to persons skilled in this art without departing from the scope and spirit of this invention, which is to be ascertained from the appended claims.

I claim:

1. A self contained air conditioning unit with ventilation and pressure control capable of exchanging a portion of indoor circulating air of a conditioned space with fresh outdoor air, and capable of creating one or both of a positive or negative pressure in the conditioned space, comprising:
a housing;
a refrigeration circuit within said housing including a compressor, a condenser coil, and an evaporator coil;
a condenser side including an inlet port in said housing, a fresh air intake plenum, a condenser air path through said condenser coil, a condenser fan forcing air along said condenser air path to an outlet port, and said intake and outlet ports connecting with the fresh outdoor air;
a conditioned air circuit including a return air intake on said housing leading into a room return air plenum, a conditioned air path leading from said return air plenum past a HEPA filter and through said evaporator coil to a supply air duct, and an evaporator fan moving said air along said conditioned air path and out said supply air duct into the conditioned space;
an ERV air-to-air heat exchanger core within said housing having a fresh air path with a fresh air intake port communicating with said fresh air intake plenum and a fresh air outlet discharging into said room return air plenum; and with an indoor air path having an indoor air port communicating with said room return air plenum and an outlet port discharging into the fresh air intake plenum, and a fresh-air ventilation fan and an exhaust air ventilation fan moving respective air flows along said fresh air path and said indoor air path;
sensor means for sensing air pressure in said conditioned space relative to pressure outside said conditioned space; and
control means coupled with said sensor means and with said first and second ventilation fans for controlling the air flow along one or both of said fresh air path and said indoor air path to create and maintain a desired overpressure or underpressure in said conditioned space.

2. The self-contained air conditioning unit of claim 1, wherein said conditioned space has a window having a window frame with said window being openable to outdoor air, and comprising intake and exhaust ducts connecting said intake and outlet ports to the outside air, and a plate member through which said ducts pass, and which is adapted to fit said window frame.

3. The self-contained air conditioning unit of claim 1, wherein said conditioned air circuit also includes a UV sterilizer arrangement in advance of said HEPA filter.

4. The self-contained air conditioning unit of claim 1, wherein said condenser fan has a variable air flow and is operated at full capacity or a lesser capacity.

5. The self-contained air conditioning unit of claim 4, wherein said evaporator fan is operated constantly at full capacity.

6. The self-contained air conditioning unit of claim 1, wherein said one or both of said ventilation fans has a variable airflow that is controlled by said control means.

7. The self-contained air conditioning unit of claim 1, wherein said core is a counterflow air-to-air heat exchanger.

8. The self-contained air conditioning unit of claim 1, wherein said unit is formed of an upper portion and a lower portion, wherein said lower portion contains said refrigeration circuit, with said condenser air path passing from a first end thereof to a port at a mid portion thereof venting to said outlet port; the conditioned air path passing from a second end thereof to a port at a midportion thereof venting to said supply air duct; said upper portion containing said fresh air intake plenum at a first end thereof corresponding to the first end of the lower portion, with a first end cap closing off said first ends and ducting air from said fresh air intake plenum to the first end of the lower portion; and containing said room return air plenum and said HEPA filter at a second end of the upper portion, situated in alignment with the second end of said lower portion, and with a second end cap closing off said second ends and ducting air from said room return air plenum and said HEPA filter into the second end of said lower portion.

* * * * *